US008911591B2

(12) United States Patent
Ankerfors et al.

(10) Patent No.: US 8,911,591 B2
(45) Date of Patent: Dec. 16, 2014

(54) METHOD FOR PROVIDING A NANOCELLULOSE INVOLVING MODIFYING CELLULOSE FIBERS

(75) Inventors: Mikael Ankerfors, Stockholm (SE); Tom Lindstrom, Sollentuna (SE)

(73) Assignee: Innventia AB, Stockholm (SE)

( * ) Notice: Subject to any disclaimer, the term of this patent is extended or adjusted under 35 U.S.C. 154(b) by 604 days.

(21) Appl. No.: 12/936,916

(22) PCT Filed: Apr. 8, 2009

(86) PCT No.: PCT/SE2009/050371
§ 371 (c)(1),
(2), (4) Date: Oct. 8, 2010

(87) PCT Pub. No.: WO2009/126106
PCT Pub. Date: Oct. 15, 2009

(65) Prior Publication Data
US 2011/0036522 A1    Feb. 17, 2011

(30) Foreign Application Priority Data
Apr. 10, 2008   (SE) ..................... 0800807

(51) Int. Cl.
*D21H 11/18*    (2006.01)
*D21H 11/20*    (2006.01)
*D21H 15/02*    (2006.01)
*D21C 9/00*     (2006.01)

(52) U.S. Cl.
CPC ............. *D21H 11/20* (2013.01); *D21H 11/18* (2013.01); *D21H 15/02* (2013.01); *D21C 9/007* (2013.01); *D21C 9/002* (2013.01)
USPC ............................. 162/62; 536/56

(58) Field of Classification Search
CPC ........... D21H 11/18; D21H 17/14; C08L 1/02
USPC ........................................... 162/62
See application file for complete search history.

(56) References Cited

U.S. PATENT DOCUMENTS

| 4,341,807 A | 7/1982 | Turbak et al. |
| 4,481,077 A | 11/1984 | Herrick |

(Continued)

FOREIGN PATENT DOCUMENTS

| CA | 2437616 A1 | 2/2005 |
| JP | 0959301 A | 3/1997 |

(Continued)

OTHER PUBLICATIONS

Wegner et al., A Fundamental Review of the Relationships between Nanotechnology and Lignocellulosic Biomass, 2009, Forest Products Laboratory.*
Walecka, An investigation of Low Degree of Substitution Carboxymethylcelluloses, Jul. 1956, TAPPI, vol. 39, No. 7,p. 458-463.*
International Search Report, dated Jun. 25, 2009, from corresponding PCT application.

(Continued)

*Primary Examiner* — Anthony Calandra
(74) *Attorney, Agent, or Firm* — Pearne & Gordon LLP (57) ABSTRACT

A method for the manufacturing of nanocellulose. The method includes a first modification of the cellulose material, where the cellulose fibers are treated with an aqueous electrolyte-containing solution of an amphoteric cellulose derivative. The modification is followed by a mechanical treatment. By using this method for manufacturing nanocellulose, clogging of the mechanical apparatus is avoided. Also the nanocellulose is manufactured in accordance with the method and uses of the cellulose.

8 Claims, 7 Drawing Sheets

Case D = MFC gel

(56) References Cited

U.S. PATENT DOCUMENTS

| | | | |
|---|---|---|---|
| 6,183,596 | B1 | 2/2001 | Matsuda et al. |
| 2005/0067730 | A1* | 3/2005 | Yano et al. .................... 264/109 |
| 2007/0053960 | A1* | 3/2007 | Brown et al. ................. 424/445 |
| 2009/0308552 | A1 | 12/2009 | Yano et al. |

FOREIGN PATENT DOCUMENTS

| | | |
|---|---|---|
| JP | 2001288692 A | 10/2001 |
| JP | 2002173888 A | 6/2002 |
| JP | 2002194691 A | 7/2002 |
| JP | 2002536507 A | 10/2002 |
| JP | 2007231438 A | 9/2007 |
| WO | 00047628 A2 | 8/2000 |
| WO | 01/21890 A1 | 3/2001 |
| WO | 2005/080678 A1 | 9/2005 |
| WO | 2007001229 A1 | 1/2007 |
| WO | 2007088974 A1 | 8/2007 |
| WO | 2008/010464 A1 | 1/2008 |

OTHER PUBLICATIONS

Lars Wagberg et al., "The Build-Up of Polyelectrolyte Multilayers of Microfibrillated Cellulose and Cationic Polyelectrolytes", Langmuir, 2008, pp. 784-795, vol. 24, No. 3; Cited in International Search Report & specification.

Database Compendex, "Modifications of cellulose and their applications to pulp and paper", 2006; Cited in International Search Report.

Dan Wang et al., "Characterization and Biodegradability of Amphoteric Superabsorbent Polymers", Journal of Applied Polymer Science, 2008, pp. 4116-4120, vol. 107, No. 6; Cited in International Search Report.

"Nanocellulose", Wikipedia, the free encyclopedia, retrieved from the Internet on Apr. 3, 2013, http://en.wikipedia.org/wiki/Nanocellulose#Applications.

Extended European Search Report, dated Mar. 1, 2013, from corresponding EP application.

Translation of Japanese Office Action, dated Nov. 26, 2013, from corresponding JP application.

* cited by examiner

Fig 1.

Case C = MFC gel

Fig 2.

Case D = MFC gel

Fig 3.

Case E = MFC gel

Fig 4.

Case F = MFC gel

Fig 5.

Case H = MFC gel

Fig 6.

Case K = No MFC gel

Fig 7.

Case L = MFC gel

METHOD FOR PROVIDING A NANOCELLULOSE INVOLVING MODIFYING CELLULOSE FIBERS

FIELD OF INVENTION

This invention concerns the technical field of treatment of cellulose containing material for the manufacturing of nanocellulose (microfibrillated cellulose). Also disclosed is nanocellulose manufactured in accordance with said method and uses of said cellulose.

BACKGROUND

In WO2005080678 a method for the modification of lignocellulosic materials is disclosed. Cellulose fibres are treated with an aqueous electrolyte-containing solution of an amphoteric cellulose derivative for at least 5 minutes at a temperature of at least 50° C. The pH during the treatment is approximately 1.5-4.5 or higher than 11; or the concentration of the electrolyte is approximately 0.0001-0.05 M if the electrolyte has monovalent cations, or approximately 0.0002-0.1 M if the electrolyte has divalent cations. Further said document relates to products obtained by the above mentioned method and uses of said products for manufacturing paper with a high wet strength.

However nothing is mentioned in the above document about manufacturing of nanocellulose or similar.

In Wågberg et al (2008) the reaction between chloroacetic acid and lignocellulose fibres is described as a pre-treatment to ease delamination in a homogenizer in order to create nanocellulose or microfibrillar cellulose. However, attachment of carboxymethylcellulose polymers to the lignocellulosic fibres is not described.

Through U.S. Pat. No. 4,341,807 further a method for manufacturing a microfibrillated cellulose or nanocellulose is disclosed by using homogenization. A problem when manufacturing nanocellulose from pulp is however the clogging of the homogenizer, when the pulp is pumped through high pressure fluidizers/homogenizers. Another problem is the excessive energy consumption during homogenization, unless the pulp before refining is subjected to some type of physiochemical pretreatment. Thus there is a need for a process wherein the clogging problem and the excessive energy consumption can be alleviated and/or avoided.

SUMMARY OF THE INVENTION

The present invention solves the above problem by providing according to a first aspect a method for providing a nanocellulose involving modifying cellulose fibers wherein the method comprises the following steps:
i) treating cellulose fibers for at least 5 minutes with an aqueous electrolyte-containing solution of an amphoteric carboxymethyl cellulose (amphoteric CMC) or a derivative thereof, preferably a low molecular amphoteric CMC or a CMC derivative thereof, whereby the temperature during the treatment is at least 50° C., and at least one of the following conditions apply:
  A) the pH of the aqueous solution during the treatment lies in the interval of approximately 1.5-4.5, preferably in the region 2-4; or
  B) the pH of the aqueous solution during the treatment is higher than approximately 11; or
  C) the concentration of the electrolyte in the aqueous solution lies in the interval of approximately 0.0001-0.5 M, preferably approximately 0.001-0.4 M, if the electrolyte has monovalent cations (such as $Na_2SO_4$), or in the range of approximately 0.0001-0.1 M, preferably approximately 0.0005-0.05 M, if the electrolyte has divalent cations (such as $CaCl_2$),
ii) adjusting the pH by using a basic and/or an acidic liquid into a pH range of from about 5 to about 13, preferably the pH is adjusted to a pH from about 6 to about 12, and
iii) treating said material in a mechanical comminution device, thus providing said nanocellulose.

This invention thereby involves attachment of amphoteric CMC polymers to lignocellulosic fibres as a pre-treatment before homogenization with the purpose of manufacturing nanocellulose. The attachment of amphoteric CMC polymers has proven to have several benefits, as outlined below.

The attachment of amphoteric CMC polymers decreases the energy consumption considerably and makes it possible to avoid clogging problems. Furthermore, it increases the anionic charge density of the fibres, which facilitates the delamination and, furthermore, enables delamination at much lower charge densities than if the charges would have been introduced by for instance any carboxymethylation reaction. Moreover, the CMC attachment process is aqueous based, which is beneficial since no other solvents than water is needed.

By using amphoteric CMC polymers, the attachment is easier and the attachment degree is increased as compared to anionic CMC.

Condition C is preferably combined with either of conditions A or B in step i), when applicable. The treated cellulose fibers may also after step i) be washed first with an acidic liquid and thereupon an essentially neutral liquid, preferably water.

The present invention also provides, according to a second aspect, a modified lignocellulosic material (nanocellulose) obtained by the method according to the first aspect. The attached amount of amphoteric CMC to lignocellulosic fibres is in the interval of from 5 to 250 milligram amphoteric CMC/gram dry fibre, preferably from 7 to 200 milligram amphoteric CMC/gram dry fibre and more preferably from 10 to 150 milligram amphoteric CMC/gram dry fibre. The attachment of amphoteric CMC as described herein advantageously enables an aqueous pre-treatment process for the manufacture of nanocellulose with less energy consumption and without the risk of clogging. This effect is attained by attachment of relatively small amounts of amphoteric CMC which results in lower charge densities than if a carboxymethylation reaction would have been used. Naturally, the anionic charge density of the amphoteric CMC used in the method influences the amount of CMC needed. CMC of high anionic charge density lowers the amount of CMC needed.

The present invention also provides according to a third aspect use of the lignocellulosic material (nanocellulose) of the second aspect in cosmetic products, pharmaceutical products, food products, paper products, composite materials, coatings, hygiene/absorbent products, films, emulsion/dispersing agents, drilling muds and to enhance the reactivity of cellulose in the manufacture of regenerated cellulose or cellulose derivatives or in rheology modifiers.

DETAILED DESCRIPTION OF THE INVENTION

It is intended throughout the present description that the expression "amphoteric cellulose derivative" embraces any cellulose derivative comprising simultaneously both cationic and anionic moieties. Further said amphoteric cellulose derivative is preferably an amphoteric cellulose derivative which still is net, negatively charged, but comprises a less amount of cationically active groups. Still further preferred said cellulose derivative is an amphoteric CMC (CMC=carboxymethyl cellulose) derivative, especially preferred is an amphoteric CMC derivative with a preferred anionic molar substitution degree between 0.3 and 1.2, i.e. D.S=0.3-1.2 and the viscosity may be approximately 25-8, 000 mPa at a concentration of 4%.

This CMC derivative may further have been cationized in a, for the skilled person, well known manner to a substitution degree between 0.00001 and 1.0, preferably 0.00001 and 0.4. The cationization is preferably performed by the introduction of at least one ammonium function; most preferred a secondary, tertiary or quaternary ammonium function (or a mixture thereof) into the derivative.

It is intended throughout the present description that the expression "mechanical comminution device" means any device which may be suitable for providing a nanocellulose (a microfibrillated cellulose) as set out above, and said device may e.g. be a refiner, a fluidizer, a homogenizer or a microfluidizer.

According to a preferred embodiment of the first aspect of the present invention there is provided a method wherein said cellulose fibres (cellulose material) is present in the form of a pulp, which may be chemical pulp, mechanical pulp, thermo-mechanical pulp or chemi(thermo)mechanical pulp (CMP or CTMP). Said chemical pulp is preferably a sulphite pulp or a kraft pulp.

The pulp may consist of pulp from hardwood, softwood or both types. The pulp may e.g. contain a mixture of pine and spruce or a mixture of birch and spruce. The chemical pulps that may be used in the present invention include all types of chemical wood-based pulps, such as bleached, half-bleached and unbleached sulphite, kraft and soda pulps, and mixtures of these. The consistency of the pulp during manufacture of nanocellulose may be any consistency, ranging from low consistency through medium consistency to high consistency.

The preferred concentration of amphoteric cellulose derivative is approximately 0.02-4% w/w, calculated on the dry weight of the fiber material. A more preferred concentration is approximately 0.04-2% w/w, and the most preferred concentration of additive is approximately 0.08-1% w/w.

According to a preferred embodiment of the first aspect of the present invention there is provided a method wherein the cellulose fibres are treated for approximately 5-180 minutes; a preferred treatment (adsorption) period is approximately 10-120 min.

According to a preferred embodiment of the first aspect of the present invention there is provided a method wherein the temperature during the treatment is in excess of approximately 50° C., preferably at least approximately 100° C., and most preferred up to approximately 120° C. The method according to the invention may thus be carried out at a pressure in excess of atmospheric pressure. Suitable equipment and working conditions for this will be obvious for one skilled in the arts.

According to a preferred embodiment of the first aspect of the present invention there is provided a method wherein condition C applies together of either condition A or condition B in step i).

According to a preferred embodiment of the first aspect of the present invention there is provided a method wherein said cellulose fibers is contained in a pulp, preferably a sulphite pulp or a kraft pulp.

The preferred concentration of pulp is approximately 0.5-50%, a more preferred concentration interval is approximately 5-50%, and the most preferred concentration interval is approximately 10-30%. Such high concentration mixes are known to one skilled in the arts within the relevant technical field, and are suitable for use in association with the present invention.

Preferred features of each aspect of the invention are as for each of the other aspects mutatis mutandis. The prior art documents mentioned herein are incorporated to the fullest extent permitted by law. The invention is further described in the following examples in conjunction with the appended figures, which do not limit the scope of the invention in any way. Embodiments of the present invention are described in more detail with the aid of examples of embodiments and figures, the only purpose of which is to illustrate the invention and are in no way intended to limit its extent.

FIGURES

In the appended FIGS. 1-7, resulting products after homogenisation are shown as set out in the examples part below. More specifically.

EXAMPLES

Cases A-F

Pulp: Commercial Never Dried Bleached Sulphite Pulp (Domsjö ECO Bright, Domsjö Fabriker)
Procedure:
1. The never dried pulp was first dispersed in deionised water. Two liters of deionised water was added to 30 grams of pulp and was then dispersed with 10000 revolutions in a laboratory disintegrator in accordance to (ISO 5263-1:2004).
2. The pulp was then ion-exchanged into its hydrogen counter-ion form. Firstly, the HCl was added to the pulp to a concentration of $10^{-2}$ M (pH is 2). The pH was held at 2 for 30 minutes. Then the pulp was washed with deionised water on a büchner funnel until the conductivity of the filtrate was below 5 µS/cm.
3. The pulp was then ion-exchanged into its sodium counter-ion form. Firstly, the $NaHCO_3$ was added to the pulp to a concentration of $10^{-3}$ M and NaOH was then added to reach a pH of 9. The pH was held at 9 for 30 minutes. Then the pulp was washed with deionised water on a büchner funnel until the conductivity of the filtrate was below 5 µS/cm.
4. Amphoteric-CMC with an anionic degree of substitution of 0.64, cationic degree of substitution of 0.048 and an intrinsic viscosity of 2.0 was dissolved in deionised water.
5. The CMC-attachment was carried out in accordance to Laine et al. (Laine, J. et al. (2000) Nordic Pulp and Paper Research Journal 15(5), page 520-526). Conditions during attachment: pulp concentration=20 gram/liter; temperature=120° C.; treatment time=2 hours; $CaCl_2$-concentration=0.05 M; water=deionised water. Different amounts of CMC was added for the different cases, A-F (Case A=0 mg CMC/g fibre, Case B=10 mg CMC/g fibre, Case C=20 mg CMC/g fibre, Case D=40 mg CMC/g fibre, Case E=80 mg CMC/g fibre, Case F=120 mg CMC/g fibre).

6. After the CMC-attachment treatment, the pulp was washed with deionised water on a büchner funnel until the conductivity of the filtrate was below 5 μS/cm.
7. The pulp was then ion-exchanged into its sodium counter-ion form as described above in step 2 and 3.
8. The pulps (2% concentration in deionised water) were then homogenised with one pass through a Microfluidizer M-110EH (Microfluidics Corp.) at an operating pressure of 1750 bar. The chambers that were used had an inner diameter of 200 μm and 100 μm.

Cases G-H

Pulp: Commercial never dried bleached sulphite dissolving pulp (Domsjö Dissolving plus, Domsjö Fabriker)
Procedure:
1. The never dried pulp was first dispersed in deionised water. Two liters of deionised water was added to 30 grams of pulp and was then dispersed with 10000 revolutions in a laboratory disintegrator in accordance to (ISO 5263-1:2004).
2. The pulp was then ion-exchanged into its hydrogen counter-ion form. Firstly, the HCl was added to the pulp to a concentration of $10^{-2}$ M (pH is 2). The pH was held at 2 for 30 minutes. Then the pulp was washed with deionised water on a büchner funnel until the conductivity of the filtrate was below 5 μS/cm.
3. The pulp was then ion-exchanged into its sodium counter-ion form. Firstly, the NaHCO$_3$ was added to the pulp to a concentration of $10^{-3}$ M and NaOH was then added to reach a pH of 9. The pH was held at 9 for 30 minutes. Then the pulp was washed with deionised water on a büchner funnel until the conductivity of the filtrate was below 5 μS/cm.
4. Amphoteric-CMC with an anionic degree of substitution of 0.64, cationic degree of substitution of 0.048 and an intrinsic viscosity of 2.0 was dissolved in deionised water.
5. The CMC-attachment was carried out in accordance to Laine et al. (Laine, J. et al. (2000) Nordic Pulp and Paper Research Journal 15(5), page 520-526). Conditions during attachment: pulp concentration=20 gram/liter; temperature=120° C.; treatment time=2 hours; CaCl$_2$-concentration=0.05 M; water=deionised water. Different amounts of CMC was added for the different cases G-H (Case G=0 mg CMC/g fibre, Case H=80 mg CMC/g fibre).
6. After the CMC-attachment treatment, the pulp was washed with deionised water on a büchner funnel until the conductivity of the filtrate was below 5 μS/cm.
7. The pulp was then ion-exchanged into its sodium counter-ion form as described above in step 2 and 3.
8. The pulps (2% concentration in deionised water) were then homogenised with one pass through a Microfluidizer M-110EH (Microfluidics Corp.) at an operating pressure of 1750 bar. The chambers that were used had an inner diameter of 200 μm and 100 μm.

Case I

Pulp: Commercial Never Dried Bleached Sulphite Pulp (Domsjö ECO Bright, Domsjö Fabriker)
Procedure:
1. The never dried pulp was first dispersed in deionised water. Two liters of deionised water was added to 30 grams of pulp and was then dispersed with 10000 revolutions in a laboratory disintegrator in accordance to (ISO 5263-1:2004).
2. The pulp was then ion-exchanged into its hydrogen counter-ion form. Firstly, the HCl was added to the pulp to a concentration of $10^{-2}$ M (pH is 2). The pH was held at 2 for 30 minutes. Then the pulp was washed with deionised water on a büchner funnel until the conductivity of the filtrate was below 5 μS/cm.
3. The pulp was then ion-exchanged into its sodium counter-ion form. Firstly, the NaHCO$_3$ was added to the pulp to a concentration of $10^{-3}$ M and NaOH was then added to reach a pH of 9. The pH was held at 9 for 30 minutes. Then the pulp was washed with deionised water on a büchner funnel until the conductivity of the filtrate was below 5 μS/cm.
4. Amphoteric-CMC with an anionic degree of substitution of 0.65, cationic degree of substitution of 0.048 and an intrinsic viscosity of 2.0 was dissolved in tap water.
5. The CMC-attachment was carried out in accordance to Laine et al. (Laine, J. et al. (2000) Nordic Pulp and Paper Research Journal 15(5), page 520-526). Conditions during attachment: pulp concentration=20 gram/liter; temperature=room temperature (around 20° C.); treatment time=2 hours; water=tap water; CMC addition=10 mg CMC/g fibre, no addition of extra electrolytes.
6. After the CMC-attachment treatment, the pulp was washed with deionised water on a büchner funnel until the conductivity of the filtrate was below 5 μS/cm.
7. The pulp was then ion-exchanged into its sodium counter-ion form as described above in step 2 and 3.
8. The pulps (2% concentration in deionised water) were then homogenised with one pass through a Microfluidizer M-110EH (Microfluidics Corp.) at an operating pressure of 1700 bar. The chambers that were used had an inner diameter of 200 μm and 100 μm.

Case J

Pulp: Commercial Never Dried Bleached Sulphite Pulp (Domsjö ECO Bright, Domsjö Fabriker)
Procedure:
1. The never dried pulp was first dispersed in deionised water. Two liters of deionised water was added to 30 grams of pulp and was then dispersed with 10000 revolutions in a laboratory disintegrator in accordance to (ISO 5263-1:2004).
2. The pulp was then ion-exchanged into its hydrogen counter-ion form. Firstly, the HCl was added to the pulp to a concentration of $10^{-2}$ M (pH is 2). The pH was held at 2 for 30 minutes. Then the pulp was washed with deionised water on a büchner funnel until the conductivity of the filtrate was below 5 μS/cm.
3. The pulp was then ion-exchanged into its sodium counter-ion form. Firstly, the NaHCO$_3$ was added to the pulp to a concentration of $10^{-3}$ M and NaOH was then added to reach a pH of 9. The pH was held at 9 for 30 minutes. Then the pulp was washed with deionised water on a büchner funnel until the conductivity of the filtrate was below 5 μS/cm.
4. Anionic-CMC with an anionic degree of substitution of 0.57 and an intrinsic viscosity of 1.4 was dissolved in deionised water.
5. The CMC-attachment was carried out in accordance to Laine et al. (Laine, J. et al. (2000) Nordic Pulp and Paper Research Journal 15(5), page 520-526). Conditions during attachment: pulp concentration=20 gram/liter; temperature=120° C.; treatment time=2 hours; $CaCl_2$-concentration=0.05 M; water=deionised water; CMC-dosage=80 mg CMC/g fibre.
6. After the CMC-attachment treatment, the pulp was washed with deionised water on a büchner funnel until the conductivity of the filtrate was below 5 µS/cm.
7. The pulp was then ion-exchanged into its sodium counter-ion form as described above in step 2 and 3.
8. The pulps (2% concentration in deionised water) were then homogenised with one pass through a Microfluidizer M-110EH (Microfluidics Corp.) at an operating pressure of 1750 bar. The chambers that were used had an inner diameter of 200 µm and 100 µm.

Case K

Pulp: Commercial never dried bleached sulphite dissolving pulp (Domsjö Dissolving plus, Domsjö Fabriker)
Procedure:
1. The never dried pulp was first dispersed in deionised water. Two liters of deionised water was added to 30 grams of pulp and was then dispersed with 10000 revolutions in a laboratory disintegrator in accordance to (ISO 5263-1:2004).
2. The pulp was then ion-exchanged into its hydrogen counter-ion form. Firstly, the HCl was added to the pulp to a concentration of $10^{-2}$ M (pH is 2). The pH was held at 2 for 30 minutes. Then the pulp was washed with deionised water on a büchner funnel until the conductivity of the filtrate was below 5 µS/cm.
3. The pulp was then ion-exchanged into its sodium counter-ion form. Firstly, the $NaHCO_3$ was added to the pulp to a concentration of $10^{-3}$ M and NaOH was then added to reach a pH of 9. The pH was held at 9 for 30 minutes. Then the pulp was washed with deionised water on a büchner funnel until the conductivity of the filtrate was below 5 µS/cm.
4. Anionic-CMC with an anionic degree of substitution of 0.57 and an intrinsic viscosity of 1.4 was dissolved in deionised water.
5. The CMC-attachment was carried out in accordance to Laine et al. (Laine, J. et al. (2000) Nordic Pulp and Paper Research Journal 15(5), page 520-526). Conditions during attachment: pulp concentration=20 gram/liter; temperature=120° C.; treatment time=2 hours; $CaCl_2$-concentration=0.05 M; water=deionised water; CMC-dosage=80 mg CMC/g fibre.
6. After the CMC-attachment treatment, the pulp was washed with deionised water on a büchner funnel until the conductivity of the filtrate was below 5 µS/cm.
7. The pulp was then ion-exchanged into its sodium counter-ion form as described above in step 2 and 3.
8. The pulps (2% concentration in deionised water) were then homogenised with one pass through a Microfluidizer M-110EH (Microfluidics Corp.) at an operating pressure of 1750 bar. The chambers that were used had an inner diameter of 200 µm and 100 µm.

Case L

Pulp: Commercial Never Dried Bleached Sulphite Pulp (Domsjö ECO Bright, Domsjö Fabriker)
Procedure:
1. The never dried pulp was first dispersed in deionised water. Two liters of deionised water was added to 30 grams of pulp and was then dispersed with 10000 revolutions in a laboratory disintegrator in accordance to (ISO 5263-1:2004).
2. The pulp was then ion-exchanged into its hydrogen counter-ion form. Firstly, the HCl was added to the pulp to a concentration of $10^{-2}$ M (pH is 2). The pH was held at 2 for 30 minutes. Then the pulp was washed with deionised water on a büchner funnel until the conductivity of the filtrate was below 5 µS/cm.
3. The pulp was then ion-exchanged into its sodium counter-ion form. Firstly, the $NaHCO_3$ was added to the pulp to a concentration of $10^{-3}$ M and NaOH was then added to reach a pH of 9. The pH was held at 9 for 30 minutes. Then the pulp was washed with deionised water on a büchner funnel until the conductivity of the filtrate was below 5 µS/cm.
4. Anionic-CMC with an anionic degree of substitution of 0.4 and an intrinsic viscosity of 15 was dissolved in deionised water.
5. The CMC-attachment was carried out in accordance to Laine et al. (Laine, J. et al. (2000) Nordic Pulp and Paper Research Journal 15(5), page 520-526). Conditions during attachment: pulp concentration=20 gram/liter; temperature=120° C.; treatment time=2 hours; $CaCl_2$-concentration=0.05 M; water=deionised water; CMC-dosage=80 mg CMC/g fibre.
6. After the CMC-attachment treatment, the pulp was washed with deionised water on a büchner funnel until the conductivity of the filtrate was below 5 µS/cm.
7. The pulp was then ion-exchanged into its sodium counter-ion form as described above in step 2 and 3.
8. The pulps (2.6% concentration in deionised water) were then homogenised with one pass through a Microfluidizer M-110EH (Microfluidics Corp.) at an operating pressure of 1750 bar. The chambers that were used had an inner diameter of 200 µm and 100 µm.

Analysis
Conductometric Titration

The attached amount of anionic CMC on the fibres was determined by conductometric titration. The conductometric titration measures the total amounts of anionic groups, e.g. carboxyl acid groups, in the pulps. Prior to the titration, the pulp was washed to different counter-ion form as follows.
1. First the pulp was set to its hydrogen counter-ion form. A sample containing 2 g of dry pulp was dispersed in 1000 ml of deionised water and then 0.01 M HCl was added, fixing pH to 2. The excessive HCl was washed away after 30 minutes with deionised water on a büchner funnel until the conductivity was below 5 µS/cm.
2. Secondly, the pulp was set to its sodium counter-ion form. The pulp was dispersed in deionised water and then 0.001 M $NaHCO_3$ was added, pH was set to 9 using NaOH. After 30 more minutes the excessive NaOH and the $NaHCO_3$ were washed away with deionised water on a büchner funnel until the conductivity was below 5 µS/cm.
3. After this, the sample was once more set to its hydrogen counter ion form (see step 1) and washed to a conductivity below 5 µS/cm.
4. Finally, the total charge density of the pulps were determined with conductometric titration according to the procedure described by Katz et al. "The determination of strong and acidic groups in sulfite pulps", svensk papperstidning no. 6/1984, page R48-R53.

The amount of attached CMC was evaluated by comparing the result from the anionic CMC pulps with the result from reference pulp, the amount of attached CMC could be determined.

Nitrogen Analysis

In order to evaluate the attached amount of amphoteric CMC, the nitrogen content in the pulps were measured. This was done since the amphoteric CMC's cationic groups contained nitrogen. The apparatus used was an Antek 7000 (Antek Instruments, Inc.) and the method was Pyro-chemiluminescence (combustion temperature=1050° C.). Before the actual measurements, a calibration curve was made with the amphoteric CMC in order to know how much nitrogen was present per mg CMC.

Intrinsic Viscosity of CMC

The intrinsic viscosity of the CMCs was measured in deionised water with 0.1 M NaCl at a temperature of 25° C.

dance with the following claims and their equivalents. For example, any of the above-noted methods can be combined with other known methods. Other aspects, advantages and modifications within the scope of the invention will be apparent to those skilled in the art to which the invention pertains.

LIST OF DOCUMENTS APPEARING IN THE DESCRIPTION

WO2005080678

U.S. Pat. No. 4,341,807

Laine et al. (Laine, J. et al. (2000) Nordic Pulp and Paper Research Journal 15(5), page 520-526) and Katz et al. "The determination of strong and acidic groups in sulfite pulps", svensk papperstidning no. 6/1984, page R48-R53.

| Case | Pulp | CMC | Anionic DS | Cationic DS | CMC Intrinsic viscosity [dl/g] | Added amount of CMC [mg/g] | Grafting/ Temp. [° C.] | Total charge density [µeq./g] | Attached amount of CMC [mg/g] | Clogging | Results in an MFC gel? |
|---|---|---|---|---|---|---|---|---|---|---|---|
| A | Sulphite | — | — | — | — | 0 | No | 50.2 | 0 | Yes | No |
| B | Sulphite | Amphoteric | 0.65 | 0.048 | 2.0 | 10 | Yes/120 | 60.9 | 10.7 | Yes | No |
| C | Sulphite | Amphoteric | 0.65 | 0.048 | 2.0 | 20 | Yes/120 | 89.3 | 19.5 | No | Yes |
| D | Sulphite | Amphoteric | 0.65 | 0.048 | 2.0 | 40 | Yes/120 | 124.7 | 40.5 | No | Yes |
| E | Sulphite | Amphoteric | 0.65 | 0.048 | 2.0 | 80 | Yes/120 | 173.4 | 80.4 | No | Yes |
| F | Sulphite | Amphoteric | 0.65 | 0.048 | 2.0 | 120 | Yes/120 | 231.3 | 113.4 | No | Yes |
| G | Dissolving | — | — | — | — | 0 | No | 30.3 | 0 | Yes | No |
| H | Dissolving | Amphoteric | 0.65 | 0.048 | 2.0 | 80 | Yes/120 | 164.5 | 80.2 | No | Yes |
| I | Sulphite | Amphoteric | 0.65 | 0.048 | 2.0 | 10 | Yes/20 | 50.9 | 0 | Yes | No |
| J | Sulphite | Anionic | 0.57 | — | 1.4 | 80 | Yes/120 | 115.3 | 23.7 | Yes | No |
| K | Dissolving | Anionic | 0.57 | — | 1.4 | 80 | Yes/120 | 107.8 | 28.2 | No | No |
| L | Sulphite | Anionic | 0.4 | — | 15 | 80 | Yes/120 | 177.3 | 61.6 | No | Yes |

Results

Figure 1:
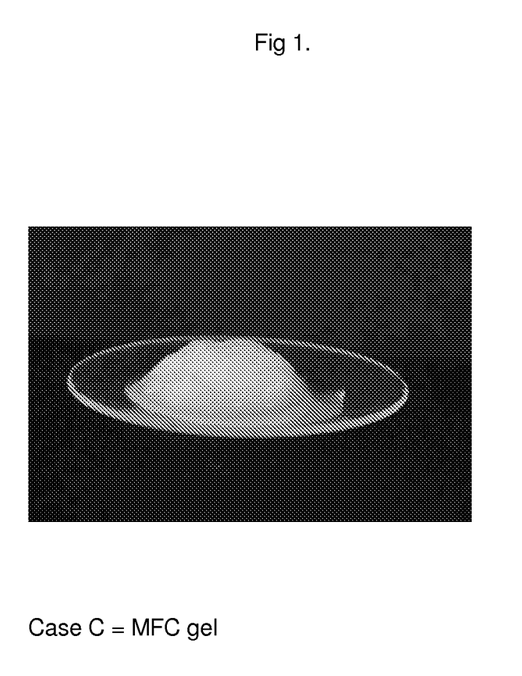
FIG. 1 shows Case C which gave rise to an MFC gel.
Figure 2:
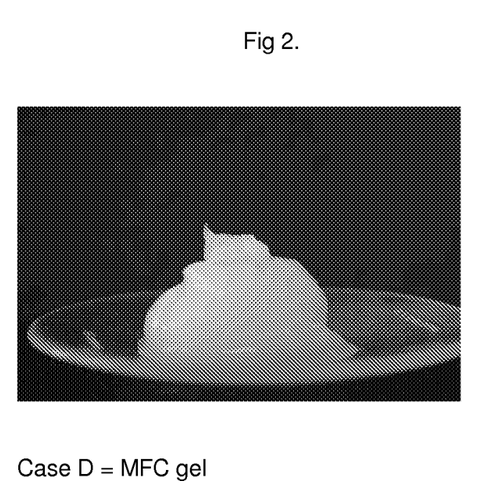
FIG. 2 shows Case D which gave rise to an MFC gel.
Figure 3:
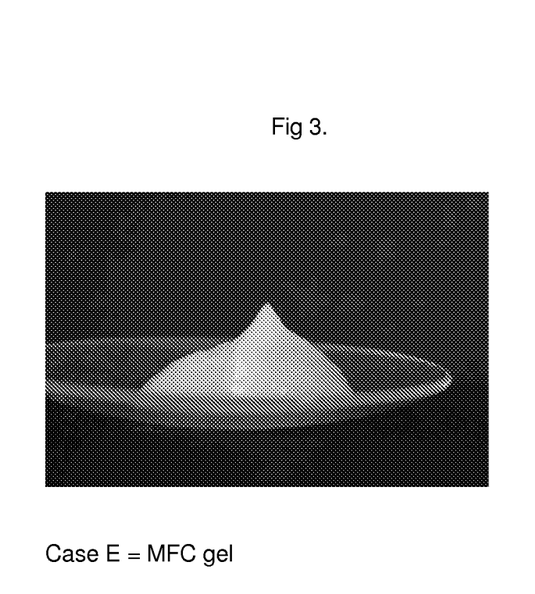
FIG. 3 shows Case E which gave rise to an MFC gel.
Figure 4:
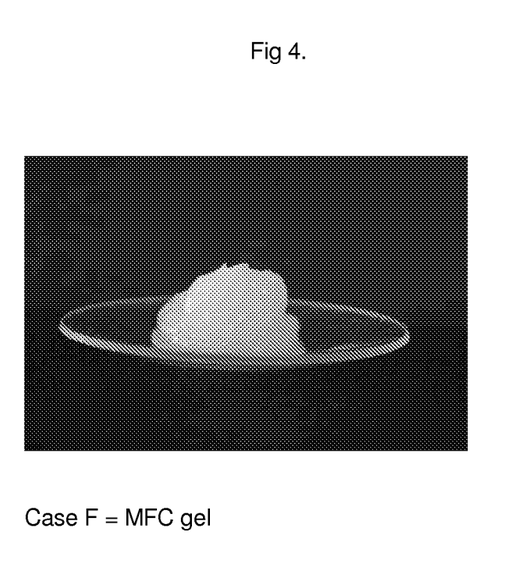
FIG. 4 shows Case F which gave rise to an MFC gel.
Figure 5:
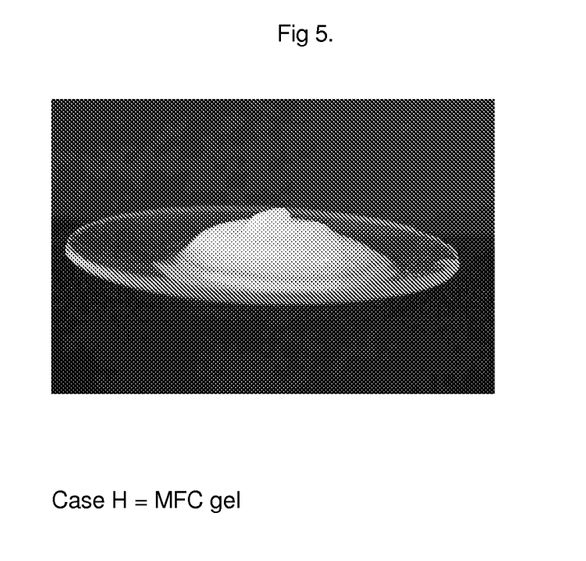
FIG. 5 shows Case H which gave rise to an MFC gel.
Figure 6:
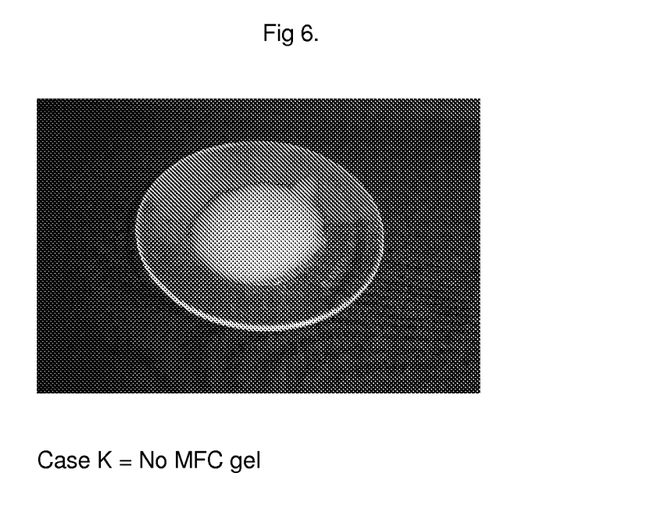
FIG. 6 shows Case K which did not give rise to an MFC gel.
Figure 7:
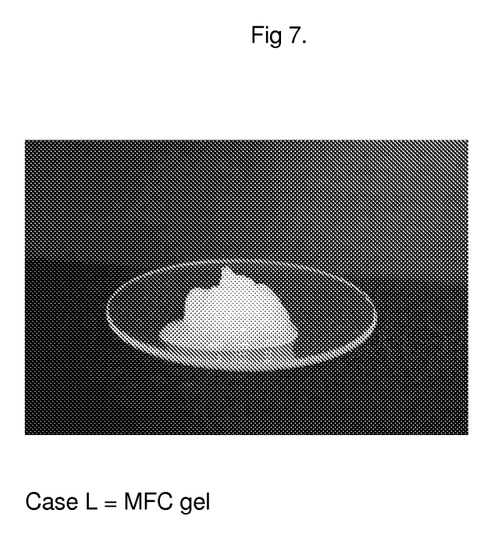
FIG. 7 shows Case L which gave rise to an MFC gel.

As can be seen in the table, it was not possible to homogenise the pulps without any CMC attachment due to clogging (Cases A and G). With the aid of amphoteric CMC it was possible to homogenise the pulp without clogging when the attachment level was above 23.6 mg/g (Cases C-F and H) and this resulted in an MFC gel. Lower attachment levels resulted in clogging (Case B). If the temperature during the CMC-attachment procedure was lowered to room temperature (Case I), no CMC was attached to the pulp and as a result it was not possible to homogenise due to clogging. In Cases J and K, anionic CMC was attached to the pulps. However, since the CMC was anionic the attachment level was lower and this made it impossible to make MFC. In Case J, sulphite pulp was used and this sample was possible to homogenise but did not result in a MFC gel. The dissolving pulp in Case K was not possible to homogenise due to clogging. All conditions in Case L, were the same as in Case J, but another anionic CMC was used instead. This CMC was easier to attach and as a result the attachment level was as high as 61.6 mg/g. Since the amount of CMC was higher it was possible to homogenise this sample and thereby produce an MFC gel. However, to reach this level three times more CMC was needed than if amphoteric CMC was used (compare with Case C). In the appended FIGS. 1-7, the resulting products after homogenisation are shown.

Various embodiments of the present invention have been described above but a person skilled in the art realizes that further minor alterations, which would fall into the scope of the present invention. The breadth and scope of the present invention should not be limited by any of the above-described exemplary embodiments, but should be defined only in accor- Wågberg et al. "The Build-Up of Polyelectrolyte Multilayers of Microfibrillated Cellulose and Cationic Polyelectrolytes". Langmuir (2008), 24(3), 784-795.

The invention claimed is:

1. A method for providing a microfibrillated cellulose (MFC) gel involving modifying cellulose fibers wherein the method comprises the following steps:
   i) treating cellulose fibers for at least 5 minutes with an aqueous electrolyte-containing solution of an amphoteric or anionic carboxymethyl cellulose or a derivative thereof, whereby the temperature during the treatment is 50° C. to 120° C., and at least one of the following conditions apply:
      A) the pH of the aqueous solution during the treatment lies in the interval of approximately 1.5-4.5; or
      B) the pH of the aqueous solution during the treatment is higher than approximately 11; or
      C) the concentration of the electrolyte in the aqueous solution lies in the interval of approximately 0.0001-0.5 M if the electrolyte has monovalent cations, or in the range of approximately 0.0001-0.1 M if the electrolyte has divalent cations,
   ii) adjusting the pH of said cellulose fibers treated in step i) if the pH is not in a range from about 5 to about 13 after step i) by using a basic or an acidic liquid into a pH range of from about 5 to about 13, wherein the cellulose fibers have attached 5 to 250 milligrams the amphoteric or anionic carboxymethyl cellulose or derivative thereof per gram dry cellulose fibers, and iii) treating said cellulose fibers having a pH in a range from about 5 to about 13 in a mechanical comminution device, thus providing said MFC gel.

2. The method according to claim 1, wherein condition C applies together with condition A or condition B in step i).

3. The method according to claim 1, wherein the amphoteric CMC derivative has an anionic molar substitution degree between 0.3 and 1.2.

4. The method according to claim 1, wherein the CMC derivative has been cationized to a substitution degree between 0.00001 and 1.0.

5. The method according to claim 4, wherein the cationization has been performed by the introduction of at least one ammonium function into the derivative.

6. The method according to claim 1, wherein the cellulose fibres are treated for approximately 5-180 minutes.

7. The method according to claim 1, wherein said cellulose fibres are contained in a pulp.

8. The method according to claim 1, wherein the amphoteric or anionic carboxymethyl cellulose or derivative thereof is an amphoteric carboxymethyl cellulose, the amphoteric carboxymethyl cellulose being provided at 20 to 120 milligram per gram dry fiber of the cellulose fibers.

* * * * *